US008588249B2

(12) United States Patent
Wheelock

(10) Patent No.: US 8,588,249 B2
(45) Date of Patent: Nov. 19, 2013

(54) METHOD AND SYSTEM FOR DELIVERING VIDEO CONTENT USING INTERNET PROTOCOL OVER A COAXIAL CABLE

(75) Inventor: Ian Wheelock, Cork (IE)

(73) Assignee: ARRIS Enterprises, Inc., Suwanee, GA (US)

( * ) Notice: Subject to any disclaimer, the term of this patent is extended or adjusted under 35 U.S.C. 154(b) by 1059 days.

(21) Appl. No.: 11/546,455

(22) Filed: Oct. 11, 2006

(65) Prior Publication Data

US 2007/0081537 A1    Apr. 12, 2007

Related U.S. Application Data

(60) Provisional application No. 60/725,522, filed on Oct. 11, 2005.

(51) Int. Cl.
*H04L 12/66* (2006.01)
*H04L 29/06* (2006.01)

(52) U.S. Cl.
CPC ..................................... *H04L 29/06* (2013.01)
USPC ............ 370/463; 370/319; 370/344; 370/389; 370/392; 370/430; 725/100; 725/111; 725/118

(58) Field of Classification Search
USPC ......... 370/270, 278, 302, 312, 389–391, 432, 370/466, 471, 473, 486; 725/111, 114, 725/138–139, 144
See application file for complete search history.

(56) References Cited

U.S. PATENT DOCUMENTS

| 6,385,647 | B1 * | 5/2002 | Willis et al. ................... 709/217 |
|---|---|---|---|
| 6,493,876 | B1 * | 12/2002 | DeFreese et al. ............. 725/100 |
| 7,103,667 | B1 * | 9/2006 | Bell et al. ...................... 709/227 |
| 7,809,942 | B2 * | 10/2010 | Baran et al. ................... 713/160 |
| 2005/0265338 | A1 * | 12/2005 | Chapman et al. ............. 370/389 |
| 2005/0289623 | A1 * | 12/2005 | Midani et al. ................. 725/100 |
| 2006/0130110 | A1 * | 6/2006 | Cho et al. ...................... 725/111 |
| 2006/0225118 | A1 * | 10/2006 | Rolls et al. .................... 725/118 |

\* cited by examiner

*Primary Examiner* — Jae Y Lee
*Assistant Examiner* — Aixa A Guadalupe-Cruz
(74) *Attorney, Agent, or Firm* — Troy A. Van Aacken

(57) ABSTRACT

Multicast information contained in a request from an IP TV set top box for video content to an IGMP manager is passed to an SA processor to perform a lookup of an SA table. A result of the lookup is the frequency of the downstream legacy channel over which the requested content is being delivered from an edge QAM device. The SA processor instructs a legacy QAM tuner to tune the determined frequency. The IGMP manager selects packets corresponding to the request content based on a program identifier that is associated with the multicast address in the SA table. As selected packets are received by the IGMP manager, multicast address information is placed into them, and they are passed on from the manager to the IP TV set top box. The IP TV set top box receives the requested content packets based on the multicast address.

6 Claims, 2 Drawing Sheets

METHOD AND SYSTEM FOR DELIVERING VIDEO CONTENT USING INTERNET PROTOCOL OVER A COAXIAL CABLE

CROSS REFERENCE TO RELATED APPLICATION

This application priority under 35 U.S.C. 119(e) to U.S. provisional patent application Ser. No. 60/725,522 entitled "IPTV over coax," which was filed Oct. 11, 2005, and is incorporated herein by reference in its entirety.

FIELD OF THE INVENTION

The present invention relates generally to communication networks and devices, and more particularly to providing IPTV video signals from legacy MPEG video transmitted over a coaxial cable network.

BACKGROUND

Community antenna television ("CATV") networks have been used for more then four decades to deliver television programming to a large number of subscribers. Increasingly, CATV networks are used by providers to provide data services to subscribers. For example, cable modems used in a broadband cable modem termination system ("CMTS") compete with digital subscriber lines ("DSL") and DSL modems used therein, which are typically implemented and supported by telephone companies. DSL service is typically provided over the same wires as a residence's telephone service.

A service provider that delivers content, for example, multimedia content such as video content programs, over a DSL network typically delivers the content, which comprises multiple packets of information in one or more streams, according to a multicast address. The multicast address is typically an Internet Protocol multicast address. Thus, from a DSL central office to a subscriber device at a display device, such as a television, requested content packets, and only requested content packets, are delivered according to the multicast protocol.

Service providers that deliver video content over a hybrid fiber coaxial cable network ("HFC"), such as cable television service providers, typically deliver content streams as MPEG digital data streams, or even still as analog program signals. Thus, all content that a cable provider makes available to a subscriber is delivered to each subscriber, even all of the programs that are not currently being received, or viewed. This 'all-content' approach has been used for years, and thus is referred to as 'legacy', and is reliable. However, much bandwidth over the HFC is wasted using a legacy delivery system because the downstream QAM channels are used to deliver most, if not all, of the available content streams, or signals, to a given user although he or she typically only uses, or watches, one program at a time.

Cable operators have the option of converting their head end system equipment and customer premises equipment to deliver and receive video content according to IP multicast. However, the cost to convert edge QAM devices and customer premises devices to deliver content from a video head end according to IP multicast would be expensive if done all at once. In addition, many operators want to avoid alienating customers that may still wish to receive analog television signals or legacy MPEG television signals with an existing legacy set top box.

Thus, there is a need in the art for a method and system for facilitating the integration of delivery of multimedia content, namely video content, according to multicast addressing while still facilitating the delivery of content using legacy equipment over the same HFC.

In addition, there is a need in the art for a method and system for converting content received over legacy channels QAM for delivery from a single customer premises device to an IP television ("IP TV") set top box.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, adaptations, variations, modifications and equivalent arrangements, the present invention being limited only by the claims appended hereto and the equivalents thereof.

Figure 1:
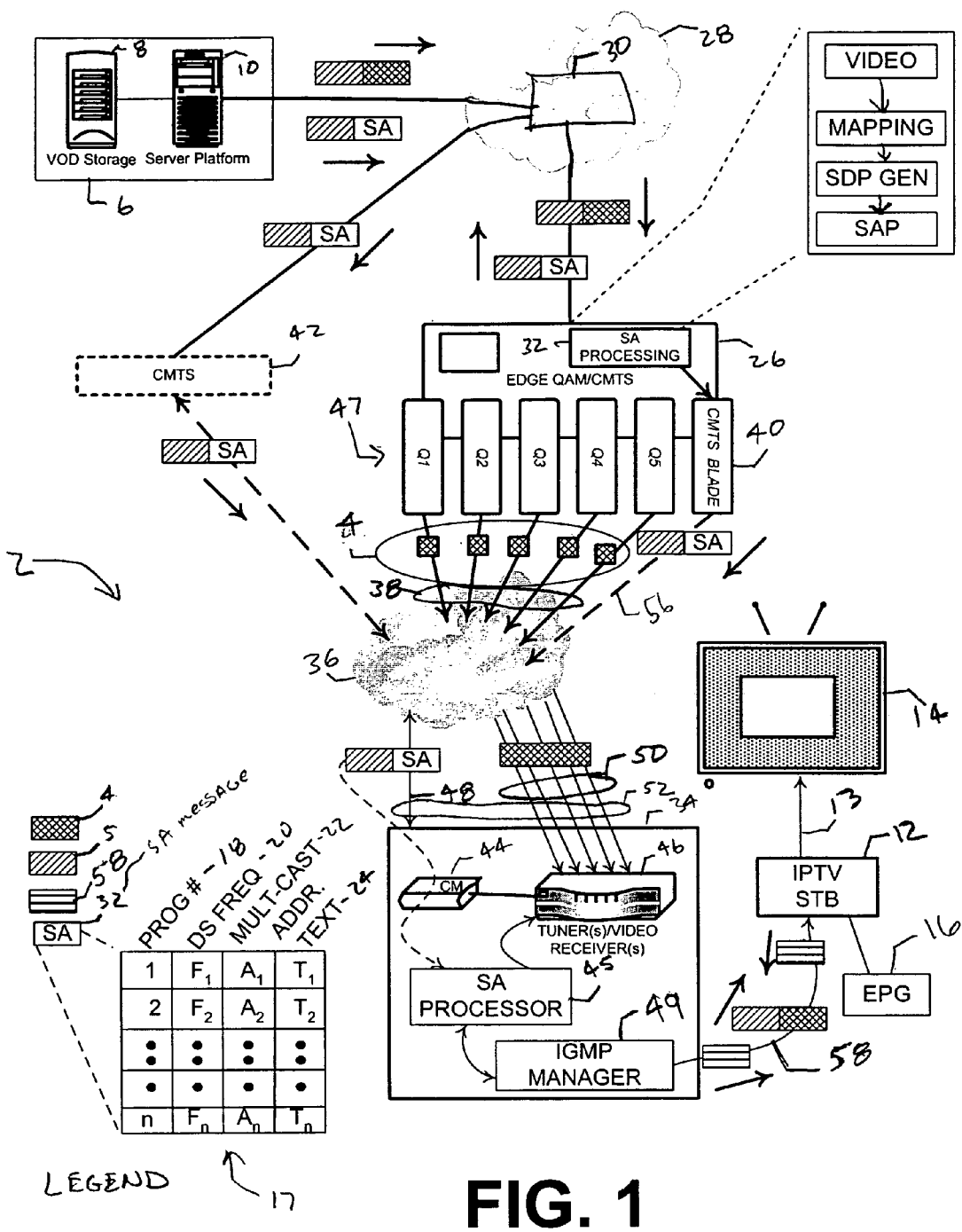
FIG. 1 illustrates system for delivering video content to a subscriber-user device.

Turning now to FIG. 1, a system 2 for delivering video content signals 4 using IP multicast information 5 from a video head end 6, which may include a video on demand ("VOD") storage device 8 and a server platform 10, to a subscriber-user device 12 is shown. It will be appreciated that video head end 6 may also contain different equipment. This different equipment may include devices that facilitate switched digital video, broadcast video (over-the-air or cable), and/or real-time feeds. Subscriber user device 12 outputs content to television 14 over an RF link, such as a coaxial cable. It will be appreciated that subscriber-user device 12 may deliver content over link 13, which may be a composite video link, a component video link, a digital video link, a wireless link or other type of video link known in the art, rather than an RF link.

When a user selects a program to watch using set top box 12, using either buttons located thereon, or a remote control for example, either by accessing a program guide or by manually selecting a channel or channels, an electronic program guide 16 ("EPG") is accessed. EPG 16 associates a channel number identifier with other information. EPG 16 may be delivered to set top box 12. Service advertisement ("SA") table 17 may be delivered in a service announcement message, comprising program information data packets. Service advertisement table 17 may include information such as, for example, program number 18, downstream video channel frequency 20, a multicast address 22 and user-readable text 24. The multicast address may be an IP multicast address that is used to transmit packets associated with a video content program from head end 6. The downstream channel frequency 20 indicates the downstream frequency that an edge QAM device uses to distribute data and content from a service provider head end toward subscribers. Program number 18 identifies content packets that correspond to a given video content stream. As known in the art, multiple streams, identified by different PIDs associated with a given program number may by used to transmit various portions of a program, such as, for example, audio, surround sound channel content, closed captioning, etc. EPG 16 and SA table 17 are typically linked by program number and/or multicast address.

SA table 17 may be received in an SA message from edge QAM device 26, an example of which is the D5 edge QAM device sold by ARRIS International, Inc., for delivering video MPEG packet streams as well as DOCSIS data and voice packets from the same device over a single link. Edge QAM Device 26 typically receives MPEG-encoded video content 4 formatted according to Internet Protocol ("IP") multicast protocol from video head end 6. IP multicast protocol is known in the art and does not require extensive and detailed explanation here. It will be appreciated that video content 4 is typically provided over a private IP network 28 from head end 6. Network 28 may include hub 30, which may be a switch, router or other similar device for directing packetized signals known in the art.

Video content signals are forwarded to edge QAM device 26, where a plurality of content program streams are mapped to a plurality of downstream QAM channels, each having a carrier/center frequency differing from the frequency/frequencies of other channel(s). The program streams 4 are mapped according to a channel plan designed by a service provider such as a cable television operator that operates server 6, network 28 and device 26. The channel mapping plan is formatted into program information data packets that compose SA message 32. SA message 32 may be generated according to Session Announcement Protocol ("SAP"), a web page, a PSIP for use in an ATSC system and SI for use in a DVB system. SAP message packet(s) 32 is/are forwarded to subscriber-premises device 34, which is located at the subscriber's home or office, over hybrid fiber coaxial ("HFC") network 36. The actual video content program streams 4 are also sent to premises device 34 over HFC 36. Streams 4 are sent over a plurality of channels 38 according to the channel mapping plan discussed above.

It will be appreciated that the SA message packets 32 may be generated at edge QAM device 26 and sent downstream over HFC network 36 from a cable modem termination system ("CMTS") blade 40, or similar data transmission device, which is integrated into the edge QAM device, or the SA packets may be sent from the edge QAM device to hub 30. The path the SA packets 32 travel if sent to hub 30 are shown are shown by the composite message symbols with arrows beside them indicating message flow direction. It will be appreciated that the sending of SA message packets 32 from edge QAM device 26 to hub 30 and then downstream via separate CMTS 42 may be preferable if a service provider has existing stand-alone CMTS equipment and does not wish to purchase extra equipment to integrate into its edge QAM device.

Regardless of whether SA message 32 is sent downstream from edge QAM device 26 and CMTS blade 40, or from video head end 6 and CMTS 42, the SA message packets are sent in a data channel, such as, for example, a DOCSIS channel, over HFC 36. It will be appreciated that the DOCSIS channel is typically at a different frequency than the separate channel frequencies used for the downstream video stream channels 38, although the data channel and the video channels are typically downstream QAM channels having 6 MHz bandwidth. The basic operation of downstream QAM channels is known in the art and does not need further detailed explanation.

SAP-formatted, for example, SA message 32 is received from HFC 36 at subscriber-premises device 34, which may be referred to as an integrated cable modem/tuner device. Premises device 34 typically integrates a cable modem ("CM") portion 44 and a tuner portion 46. In addition, premises device 34 includes SA message processor 45 and IGMP manager 49. Although separate links 48 and 50 are shown coupling CM 44 and tuner 46, respectively, to HFC 36, it will be appreciated that typically a single link 52, preferably a coaxial cable, couples integrated premises device 34 to the HFC. Link 52 is illustrated by encircling links 48 and 50. Links 48 and 50 are shown separate to illustrate that CM 44 receives and decodes data from the data, or DOCSIS, channel and tuner 46 typically tunes to, receives and decodes downstream video streams, typically encoded in a compressed format, such as, for example, MPEG. Tuner 46 may include a single tuner, but preferably includes multiple tuners so that a corresponding multiple IP multicast streams can be sent to multiple IPTV set top boxes 12. However, the number of tuners may not need to be as large as the number of IP TV set top boxes 12 served by a given integrated device 34 because typically a given QAM channel 38 can carry multiple program streams. Thus, a service provider may use statistics to determine that program streams carrying popular programs that are likely to be watched by many viewers simultaneous should be carried in the same downstream QAM channel 38. Thus, for example, if two viewers watching two separate televisions 14 coupled to two separate IPTV set top boxes 12 in the same home request different content carried by different programs streams, but those different program streams are carried in the same QAM channel, a single tuner tuned to the frequency of the given QAM channel would be sufficient to receive both requested video program packet streams.

In the just-given scenario, the channel mapping information contained in SA message 32 packets, which are preferably delivered to integrated premises device 34 via the data channel, are processed to remove broadband format information, such as DOCSIS header information, by CM 44. SA processor 45 processes the decoded SA message 32 and informs tuner 46 which downstream QAM channel frequency 38 to tune based on a program multicast address that corresponds to content requested by a user. The content request may be included in an IGMP/MLD message sent from the set top box 12 toward premises device 34. It will be appreciated that the SA message 32 could also be sent downstream from one of the edge QAM channel blades 47 via one of the legacy downstream QAM channels 38.

When a SA message 32 is sent downstream from a QAM channel blade 47, a unique Program Identifier ("PID") may be used to indicate that the SA message packets are to be regarded by tuner device 46 as data rather than video content packets. Regardless of how SA message 32 is sent downstream, when the channel corresponding to the requested channel is tuned multiple content program stream packets may be available from the output of tuner 46. However, since SA message information 32 includes a program number 18, which identifies the packets belonging to a given program. The program number of the requested content is used to select from tuner 46 the elementary streams associated with the selected program. The selected program stream(s) is/are assigned a unique IP multicast address and forwarded from integrated device 34 to IP television set top box 12 via a communication link 54, typically a wired Ethernet or wireless link. The multicast address assigned to the video content packets 4 are typically assigned by Internet management group protocol/multicast listener discovery ("IGMP/MLD") manager 49, which may generate a new multicast address for transmission over link 54.

Alternatively, the IGMP/MLD manager may read the original multicast address issued to the content stream at video head end 6 from SA table 17 and reassign the original multicast address to the video content stream. It will be appreciated that IPTV set top box 12 may interact with manager 49, for example, by sending IGMP/MLD messages 58 to instruct the set top box to select a requested program. An IGMP/MLD message 58 typically contains a multicast address that is associated with the selected program in EPG 16. Manager 49 retrieves the downstream frequency corresponding to the requested program number from SA table 17 based on the multicast address received in the IGMP/MLD message 58 received from the IPTV set top box. When the frequency has been tuned, manager 49 selects streams associated with the program number that corresponds to the selected multicast address from the SA table 17. The selected stream packets are forwarded from manager 49 toward set top box 12.

It will be appreciated that some service providers may simultaneously deliver video content to a subscriber as legacy MPEG streams over a QAM channel, or may deliver video content as IP multicast formatted MPEG streams over a data channel, such as a DOCSIS data channel. In the scenario where requested video content stream packets are delivered over an IP data network, SA table 17 would typically not contain the multicast address of the requested stream packets. Thus, manager 49 forwards the IGMP/MLD multicast address upstream to head end 26, and the requested content stream packets having the requested multicast address are sent downstream via CMTS 40 as IP multicast traffic over DOCSIS. Accordingly, these packets are delivered to IPTV set top box 12 via data channel 56 from head end 26 to over HFC 36 and link 48 as data packets, such as DOCSIS data packets. The multicast data packets are received by CM 44 and may be passed directly to IGMP manager 49, thus eliminating the need for SA processing by processor 49 and without the need for instructing tuners 46 to tune to a given downstream QAM channel. The packets, which already contain multicast address information, are forwarded from manager 49 to IPTV set top box 12, which is 'listening' for packets containing the requested multicast address.

Figure 2:
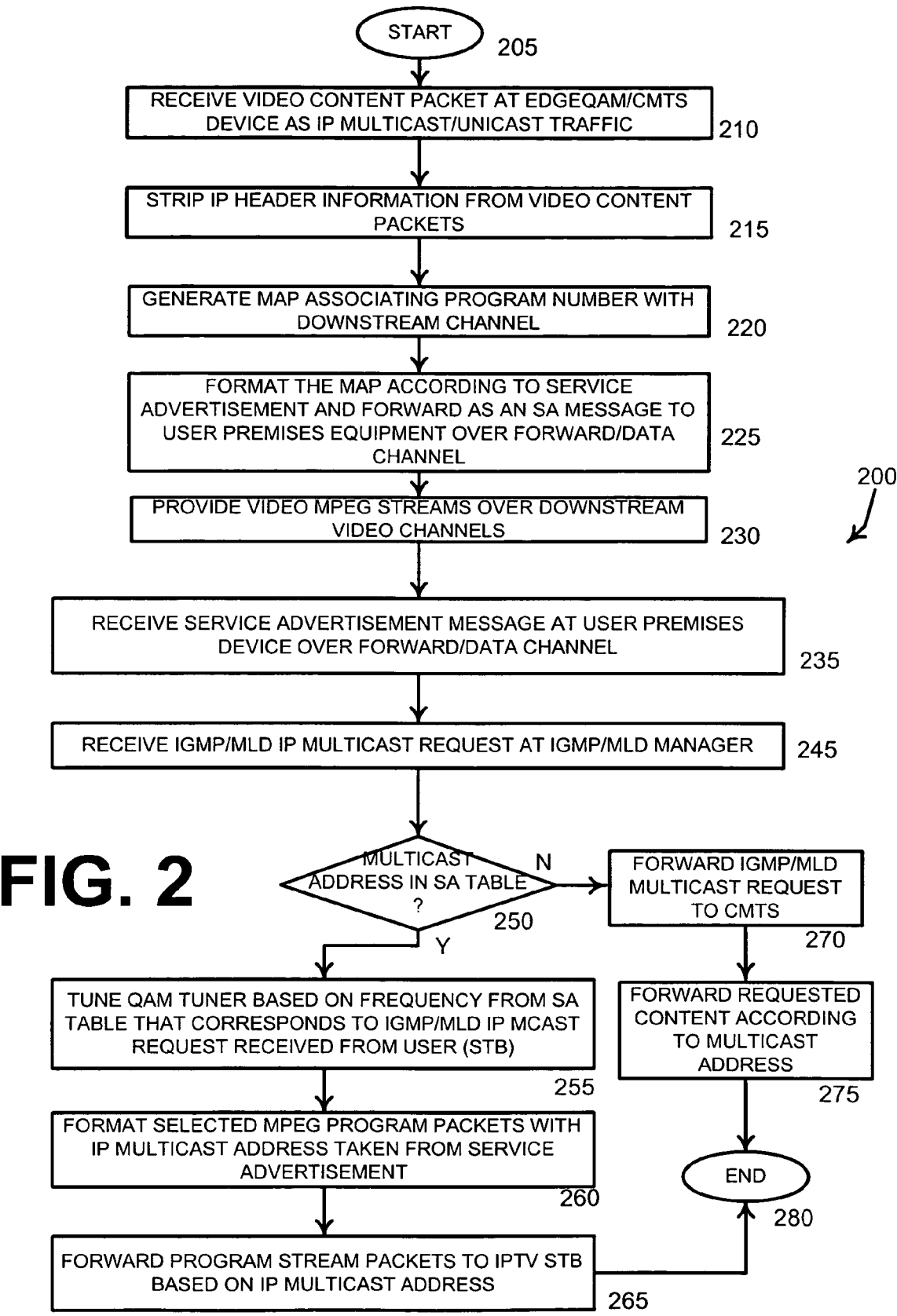
FIG. 2 illustrates a flow diagram of a method for delivering video content to a subscriber-user device.

Turning now to FIG. 2, a flow diagram of a method 200 for integrating delivery of video content with delivery of video content via MPEG streams is illustrated. Method 200 starts at step 205. Video content packets are received at an edge QAM/CMTS device at step 210. The video content packets are typically received from a video server, or other means, from a video head end as MPEG packets that have been formatted as IP multicast packets. Thus, packets belonging to a given content program contain a given multicast address. The multicast address is typically an IP multicast address.

At step 215, video content packets received from the video server are striped of the multicast address information if the packets are destined for downstream distribution over a legacy QAM channel. At step 220, a table/map is created that associates video program number and the corresponding multicast address with a downstream QAM channel for program that will be distributed via a downstream legacy channel. At step 225, the table/map is formatted according to service advertisement, and the resulting SA table is forwarded as an SA message to customer premises equipment, or a subscriber gateway device, over a downstream data channel, such as a downstream DOCSIS channel. Step 230 represents the forwarding of video content MPEG packet streams over QAM channels from a service provider head end over an HFC network to the customer premises equipment/gateway device. The SA message containing the SA table is received at step 235.

When a user selects a program, an IP TV set top box generates am IGMP/MLD request that contains a multicast address corresponding to a requested program. The IGMP/MLD request is forwarded to an IGMP/MLD manager in the customer premises/gateway device. The IGMP/MLD request is received at step 245.

At step 250, a determination is made whether the multicast address contained in the IGMP/MLD message is entered in the SA table. Presence of the requested multicast address in the SA table indicates that the requested content is provided from the edge QAM device to customer premises equipment as legacy MPEG program stream packets, rather than as multicast program stream packets. If the multicast address of the requested program content is found in the SA table, method 200 follows the 'Y' path from step 250 to step 255.

At step 255, the multicast address associated with the requested content is used to look up the associated frequency in the SA table. When the downstream QAM channel frequency is determined from the SA table, a tuner of in the customer premises device is instructed to tune the determined frequency. When the tuner has tuned to the instructed frequency, the program number identifier is associated with the requested multicast address is used to select packets arriving on the tuned downstream channel from all of the packets arriving. It will be appreciated that many content programs may be carried in a given downstream channel, especially if the programs are standard definition video programs. For example, a downstream QAM channel may carry ten standard definition television programs. Thus, the program number identifier is used to select only the packets belonging to the requested program.

The selected packets that correspond to the requested content are formatted at step 260 into multicast packets by the IGMP/MLD manager. Typically, the IGMP/MLD manager reassigns the same multicast address that was used to send the packet(s) from the video head end to the edge QAM device. Since the original multicast address for the requested content is present in the SA table—if the multicast address was not present the method would not have followed the 'Y' path at step 250—the IGMP/MLD manager has access to the original address. Thus, the video content packets that were received as MPEG packets over a legacy QAM downstream channel are reformed into multicast packets as they were when they left the video server. These reformed packets (packets associated with other streams are not passed from the IGMP/MLD manager towards the IP TV set top box) are forwarded from the customer premises equipment/gateway device to the IP TV set top box at step 265. The IP TV set top box interprets the received packets according to multicast address as if the packets had come directly from the video head end without being stripped of multicast information at the edge QAM device and then reformed at the gateway device. The process continues as long as content packets are received at the gateway device and the process ends at step 280.

Returning to discussion of step 250, if the multicast address contained in the IGMP/MLD request received by the IGMP/MLD manager from the IP TV set top box is not found in the SA table the 'N' path from step 250 is followed. Absence of the requested multicast address from the SA table typically indicates that the service provider has chosen to deliver the requested content via a downstream data channel, such as a downstream DOCSIS channel. The IGMP/MLD request message is forwarded to the CMTS device at step 270. Since the content is to be delivered over a data channel, which typically support IP multicast, for example, the multicast information is not stripped from the content packets received from the video server. Instead, the requested content packets having the multicast address as received at step 245 are forwarded directly via a data channel to the customer premises equipment/gateway. The cable modem portion thereof typically strips the broadband format information such as, for example, DOCSIS information, from packets received and forwards them to the IGMP/MLD manager at step 275. The IGMP/Manager forwards the packets to the IPTV set top box, which detects the packets according to the multicast address and decodes the packets for viewing by a user. The process ends at step 180.

Thus, regardless of whether a service provider chooses to deliver a particular content program from an edge QAM device as legacy MPEG packets over QAM channels, or as multicast content packets over a data channel, an IPTV set top box at a users location receives and interprets the content as a multicast program stream or streams. This provides the advantage that a service provider may start implementing delivery of IP multicast video in a hybrid system that also sends video content as MPEG packets over legacy QAM channels without having to completely convert the delivery network (edge QAM to customer premises device/gateway, inclusive) to accommodate delivery only by IP multicast. Such a complete conversion all at once would be costly to a service provider that may still receive value from delivering content using legacy equipment.

Gateway device 34 may apply real time protocol ("RTP") encapsulation to legacy MPEG packets received at tuner 46. RTP is a protocol that includes a header containing information, such as a timestamp value that can be derived from the Program Clock Reference ("PCR"). The PCR value is carried with each individual legacy MPEG program. RTP encapsulated MPEG packets provide a time reference, based off the PCR, that enables the IPTV STB to take into account any network jitter that may occur between the receiving gateway device and the IPTV STB. This application of RTP to legacy MPEG packets applies to IP multicast traffic transmitted from gateway device 34 to IPTV STB 12.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for delivering content requested by a user to a subscriber-user device, comprising:

receiving one or more video content packets, the one or more video content packets including the video content signal;

stripping first transport protocol information from the one or more video content packets at a cable modem termination system, wherein the first transport protocol is internet protocol multicast;

generating program information data packets associated with the stripped video content packets at the cable modem termination system;

forwarding the stripped video content packets and program information data packets to a customer premises device over a broadband communication network using a data channel at a first frequency, wherein the program information data packets associates at least a program number, a downstream frequency and a multicast address;

receiving a first request for first video content at a first device of the customer premise device from a first subscriber device;

receiving a second request for second video content at the first device of the customer premise device from a second subscriber device;

determining, based on the received first and the second request, a downstream channel frequency corresponding to the first and the second video content;

notifying, by a second device of the customer premise device, the receiver for selecting the downstream channel frequency;

in response to receiving the notification, selecting the downstream channel frequency and receiving the one or more stripped video content packets from the broadband communication network at the receiver of the customer premises device over a second channel at the selected downstream frequency;

identifying the first and the second video content using unique identifier corresponding to the first and second video content;

formatting the one or more stripped video content packets with second transport protocol information based upon the program information packets at the customer premise device, wherein the second transport protocol is internet protocol multicast; and forwarding the one or more video content packets to the first and the second subscriber-user device from the customer premise equipment according to the second transport protocol information.

2. The method of claim 1 wherein the one or more video content packets are MPEG packets.

3. The method of claim 2 further comprising applying RTP encapsulation of legacy MPEG packets at the customer premises device based on RTP information that is embedded in the MPEG packets at an edge QAM device.

4. The method of claim 1 wherein the information packets are SAP packets.

5. The method of claim 1 wherein the video content packets are forwarded to the subscriber-user device based on an IP multicast address.

6. The method of claim 1 wherein the program information packets are forwarded to the subscriber device according to DOCSIS protocol.

* * * * *